United States Patent
Lee et al.

(10) Patent No.: US 6,237,333 B1
(45) Date of Patent: May 29, 2001

(54) MICROGEL DISERSION FOR HYDRAULIC APPARATUS AND PROCESSES

(75) Inventors: Biing-Lin Lee, Broadview-Heights; Louis C. Hrusch, Chesterland, both of OH (US)

(73) Assignee: The B. F. Goodrich Company, Charlotte, NC (US)

( * ) Notice: Subject to any disclaimer, the term of this patent is extended or adjusted under 35 U.S.C. 154(b) by 0 days.

(21) Appl. No.: 09/057,247

(22) Filed: Apr. 8, 1998

(51) Int. Cl.$^7$ ............................................. F16D 39/00
(52) U.S. Cl. ............................................. 60/487; 92/85 R
(58) Field of Search ............................ 91/487; 92/85 R

(56) References Cited

U.S. PATENT DOCUMENTS

| | | | |
|---|---|---|---|
| 2,398,187 | 4/1946 | McGregor et al. | 252/78 |
| 3,053,526 | 9/1962 | Kendall | 267/1 |
| 3,236,806 | 2/1966 | Dunhan | 260/46.5 |
| 3,236,872 | 2/1966 | Manly et al. | 260/453 |
| 3,266,603 | 8/1966 | Kaminmoto | 188/100 |
| 3,379,318 | 4/1968 | Trongeau | 213/22 |
| 3,380,557 | 4/1968 | Peterson | 188/1 |
| 3,407,752 | 10/1968 | Wallace et al. | 105/197 |
| 3,442,501 | 5/1969 | Soderberg . | |
| 3,578,303 | 5/1971 | Fullam | 267/64 |
| 3,598,207 | 8/1971 | Hartel | 188/289 |
| 3,638,767 | 2/1972 | Elsner et al. | 188/268 |
| 3,652,711 | 3/1972 | Triem et al. | 260/825 |
| 3,682,461 | 8/1972 | Wachenheim | 267/31 |
| 3,687,440 | 8/1972 | Jarret et al. | 267/141 |
| 3,690,423 | 9/1972 | Trongeau | 188/271 |
| 3,715,924 | 2/1973 | Nelson | 73/368 |
| 3,716,208 | 2/1973 | Fagan et al. | 244/108 |
| 3,722,640 | 3/1973 | Taylor | 188/316 |
| 3,731,914 * | 5/1973 | Cope et al. | 267/65 R |
| 3,751,020 | 8/1973 | Kendall et al. | 267/33 |
| 3,824,208 | 7/1974 | Link et al. | 260/375 |
| 3,843,601 | 10/1974 | Bruner | 260/46.5 |
| 3,876,044 | 4/1975 | Kendall et al. | 188/282 |
| 3,968,862 | 7/1976 | Gorges et al. | 188/1 C |
| 3,968,976 | 7/1976 | Sievenpiper | 280/709 |
| 3,971,551 | 7/1976 | Kendall et al. | 267/65 R |
| 3,976,287 | 8/1976 | Kendall et al. | 267/139 |
| 4,005,858 | 2/1977 | Lochner | 267/136 |
| 4,011,929 | 3/1977 | Jeram et al. | 188/268 |

(List continued on next page.)

FOREIGN PATENT DOCUMENTS

| | | |
|---|---|---|
| 3039 6921 A1 | 7/1981 | (DE) . |
| 1382131 | 1/1975 | (GB) . |
| 1386646 | 12/1975 | (GB) . |
| WO 99/51712 | 10/1999 | (WO) . |

OTHER PUBLICATIONS

Abstract of SU 1675743.
PCT Search Report dated Sep. 29, 1999, 9 pages.
MSDS for RTV 567A, Aug. 5, 1994.
Product Description Sheet for RTV 511, Nov., 1992.
MSDS for RTV 511, Dec. 20, 1996.
Twin Otter Maintenance Manual, pp. 2–48 and 2–49, Jul. 15, 1970 and Oct. 31, 1975.
Hydraulic Fluids, Encyclopedia of Chemical Technology, vol. 12, John Wiley, (1980).

*Primary Examiner*—Hoang Nguyen
(74) *Attorney, Agent, or Firm*—Kevin L. Leffel; Helen A. Odar

(57) ABSTRACT

A novel energy hydraulic media is disclosed comprising a microgel dispersion. The microgel dispersion is a Non-Newtonian fluid. This microgel dispersion is useful in devices that utilize a hydraulic fluid, such as hydraulic energy transmission systems and mechanical energy absorbing devices. Examples include hydraulic brake systems, liquid springs, and dynamic damping devices such as aircraft landing gear shock struts, car bumpers, and automobile shock absorbers. Methods of transmitting hydraulic energy and for dissipating kinetic energy using this microgel dispersion are also disclosed.

10 Claims, 10 Drawing Sheets

U.S. PATENT DOCUMENTS

| | | |
|---|---|---|
| 4,452,437 | 6/1984 | Lochner . |
| 4,504,044 | 3/1985 | Shtarkman ............................. 267/35 |
| 4,506,869 | 3/1985 | Masclet et al. ................... 267/64.15 |
| 4,509,730 | 4/1985 | Shtarkman ............................. 267/35 |
| 4,518,513 | 5/1985 | Lochner et al. . |
| 4,529,180 | 7/1985 | Hill ................................. 267/64.28 |
| 4,628,579 * | 12/1986 | Taylor .................................... 29/422 |
| 4,741,516 | 5/1988 | Davis ................................ 267/64.13 |
| 4,760,996 | 8/1988 | Davis .................................... 267/122 |
| 5,074,389 * | 12/1991 | Slocum ................................ 188/277 |
| 5,130,041 | 7/1992 | Groenhof . |
| 5,271,314 | 12/1993 | Derrien ..................................... 92/8 |
| 5,332,795 | 7/1994 | Fujiki et al. . |
| 5,538,117 | 7/1996 | Bouchez ................................ 188/371 |
| 5,843,331 * | 12/1998 | Schober et al. ........................ 252/77 |

\* cited by examiner

MICROGEL DISERSION FOR HYDRAULIC APPARATUS AND PROCESSES

BACKGROUND

This invention relates to a hydraulic media for hydraulic processes and apparatus. More particularly, the invention relates to a hydraulic media comprising a microgel dispersion. The microgel dispersion is a Non-Newtonian fluid. This microgel dispersion is useful in devices that utilize a hydraulic fluid, such as hydraulic energy transmission systems and mechanical energy absorbing devices. Examples include hydraulic brake systems, liquid springs, and dynamic damping devices such as aircraft landing gear shock struts, car bumpers, and automobile shock absorbers. Methods of transmitting hydraulic energy and for dissipating kinetic energy using this microgel dispersion are also disclosed.

Hydraulic devices employ a fluid as the working medium, and many prior art devices employ organic fluids. In many applications, silicone fluids have replaced organic fluids because silicone fluids are more chemically stable, they can be employed at higher operating temperatures, and the viscosity of certain silicone fluids is less dependent upon temperature changes than prior organic fluids. A silicone hydraulic fluid having improved viscosity stability with respect to temperature is described in U.S. Pat. No. 2,398,187. Prior art hydraulic fluids tend to be difficult to seal, especially at higher pressures greater than 5000 psi.

Elastomers having the ability to flow like a liquid have been employed as energy dissipation media and have proven to be quite leak resistant compared to hydraulic fluids, especially silicone fluid. Silicone elastomers have been employed due to their high thermal stability, low glass transition temperature, lack of crystallinity and high compressibility. An example of a silicone elastomer that flows like a fluid under high pressure is described in U.S. Pat. No. 3,843,601. This patent discloses the chemistry of an silicone elastomer that is easily deformed under pressure and breaks into soft particles under high shear. The particles have the property of flowing under pressure. The silicone elastomer is formed by preparing a vinyl-containing silicone fluid having a molecular weight of between 20,000 and 200,000 having predominantly dimethylsiloxane units with a small amount of methylvinyl siloxane units. The elastomer is unusual since there are between 0.074 and 0.74 free end groups on the elastomer per 100 silicon atoms. It was discovered, however, that prior art elastomers degrade under high pressure shear flow. Rendering a stable media is difficult and time consuming, for example by repeatedly shearing the media until the properties become stable. Furthermore, the material described in U.S. Pat. No. 3,843,601 would crystallize at –40° C., rendering the material unsuitable for use in a landing gear shock strut application, which could operate at a temperature as low as –40° C.

Therefore, a material that is more resistant to leaking than prior art hydraulic fluids is desired. More particularly, a material having the ability to flow like a fluid is desired, and that remains relatively stable when repeatedly sheared.

SUMMARY OF THE INVENTION

The present invention is directed to a hydraulic media comprising a microgel dispersion. This novel microgel dispersion is leak resistant, flowable under pressure, has high compressibility, low thermal expansion, low hysteresis and properties that are relatively stable with time and usage as compared to prior hydraulic media. The microgel dispersion comprises from about 30 to about 80% of microgel particles dispersed in a liquid phase. The liquid phase of the microgel dispersion comprises from about 20 to about 70% of a low viscosity fluid.

The energy dissipation media is useful in hydraulic energy transmission apparatus and mechanical energy absorbing devices and applications. In one embodiment, the microgel dispersion of the instant invention is used in aircraft landing gear shock struts. In another embodiment, the microgel dispersion of the instant invention is used in an automobile bumper. In yet another embodiment, the microgel dispersion of the instant invention is used in an automobile shock absorber.

Additionally, a method for dissipating kinetic energy using the microgel dispersion is disclosed. Essentially, the method comprises applying a high shearing force to the microgel dispersion of the instant invention. The method of dissipating kinetic energy can comprise flowing the microgel dispersion through an orifice.

For a better understanding of these and other aspects and objects of the invention, references should be made to the following detailed description taken in conjunction with the accompanying drawings.

DETAILED DESCRIPTION

Figure 1:
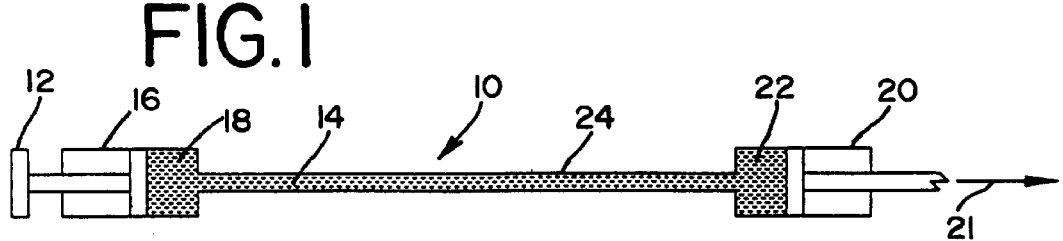
FIG. 1 presents an embodiment of a hydraulic transmission apparatus according to an aspect of the invention.

Referring to FIGS. 1–4, certain apparatus and processes according to various aspects of the invention are presented that are not drawn to scale, and wherein like components are numbered alike. Referring now to FIG. 1, a hydraulic transmission apparatus 10 is presented according to an aspect of the invention.

Hydraulic transmission apparatus 10 employs the hydrostatic principle of operation and comprises a prime mover 12, a microgel dispersion 14, a hydraulic generator 16 connected to said prime mover 12 and containing a first portion 18 of said microgel dispersion 14, a hydraulic motor 20 containing a second portion 22 of microgel dispersion 14, and a pipe 24 connecting the hydraulic generator 16 to the hydraulic motor 20. The pipe 24 is filled with the microgel dispersion 14 in fluid communication with the first 18 and second 22 portions of microgel dispersion 14. The hydraulic generator 16 is configured to convert mechanical energy from the prime mover 12 to hydraulic energy in the first portion 18 of microgel dispersion 14. The hydraulic motor 20 is configured to convert hydraulic energy from the second portion 22 of microgel dispersion 14 to mechanical energy at the hydraulic motor 20. The pipe 24 transmits the hydraulic energy from the hydraulic generator 16 to the hydraulic motor 20 through the microgel dispersion 14. In the example presented, the prime mover 12 is a pedal, the hydraulic generator 16 is a first piston and cylinder assembly, and the hydraulic motor 20 is a second piston and cylinder assembly. Movement of the prime mover 12 induces movement of the hydraulic motor 20, as indicated by arrow 21.

Figure 2:
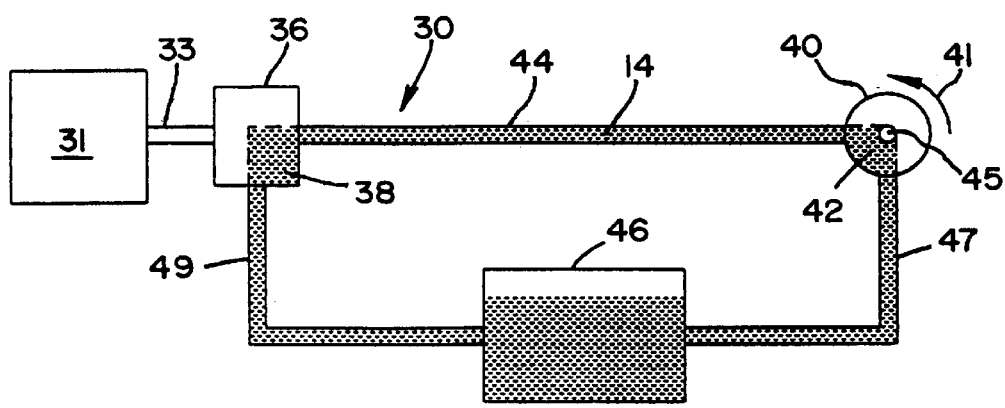
FIG. 2 presents an alternative embodiment of a hydraulic transmission apparatus according to a further aspect of the invention.

Referring now to FIG. 2, an alternative embodiment of a hydraulic transmission apparatus 30 according to a further aspect of the invention is presented that employs the hydrokinetic principle of operation. Hydraulic transmission apparatus 30 employs the hydrostatic principle of operation and comprises a prime mover 31, a microgel dispersion 14, a hydraulic generator 36 connected to said prime mover 31 by a drive shaft 33 and containing a first portion 38 of said microgel dispersion 14, a hydraulic motor 40 containing a second portion 42 of microgel dispersion 14, and a pipe 44 connecting the hydraulic generator 46 to the hydraulic motor 40. The pipe 44 is filled with the microgel dispersion 14 in fluid communication with said first 38 and second 42 portions of microgel dispersion 14. The hydraulic generator 36 is configured to convert mechanical energy from the prime mover 31 to hydraulic energy in the first portion 38 of microgel dispersion 14. The hydraulic motor 30 is configured to convert hydraulic energy from the second portion 22 of microgel dispersion 14 to mechanical energy at the hydraulic motor 40. The pipe 44 thereby transmits the hydraulic energy from the hydraulic generator 36 to the hydraulic motor 40 through the microgel dispersion 14. In the example presented, the prime mover 31 is an internal combustion engine or electric motor, the hydraulic generator 36 is a hydraulic pump, the hydraulic motor 40 is a rotary hydraulic motor having an output shaft 45. A reservoir 46 is provided connected to the hydraulic motor by a return line 47. The reservoir 46 is also connected to the hydraulic generator by a feed line 49, thus allowing continuous feed of the microgel dispersion 14 to the hydraulic generator 36 and the hydraulic motor 40 in a closed-loop circuit through the reservoir 46. Rotary motion of imparted to the hydraulic generator 36 by the drive shaft induces rotary motion of the output shaft 45, as indicated by arrow 41. Although specific examples of hydraulic generators and hydraulic motors have been presented in FIGS. 1 and 2, it is not intended to limit the invention to the specific examples presented since other types of hydraulic devices are evident to those having skill in the relevant art.

Figure 3:
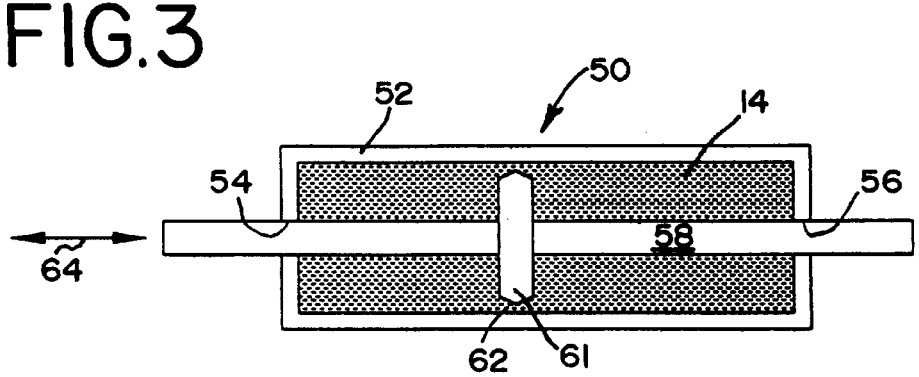
FIG. 3 presents an embodiment of a damping device according to an aspect of the invention.

Referring now to FIG. 3, a damping device 50 is presented that employs the microgel dispersion 14 according to a further aspect of the invention. Damping device 50 comprises a hollow cylinder 52 defining a first aperture 54 at one end and second aperture 56 at an opposite end, and a damping rod 58 extending through the hollow cylinder 52 through the first aperture 54 and the second aperture 56. The hollow cylinder 52 defines a cavity filled with the microgel dispersion 14. The damping rod 58 comprises a flange 61 that defines an orifice 62. Movement of the damping rod 58 as indicated by arrow 64 causes the microgel dispersion 14 to flow through the orifice 62 which generates dynamic damping by developing a pressure difference across the flange 61. Depending upon the viscosity of the microgel dispersion 14, a substantial amount of viscous damping may also be generated.

Figure 4:
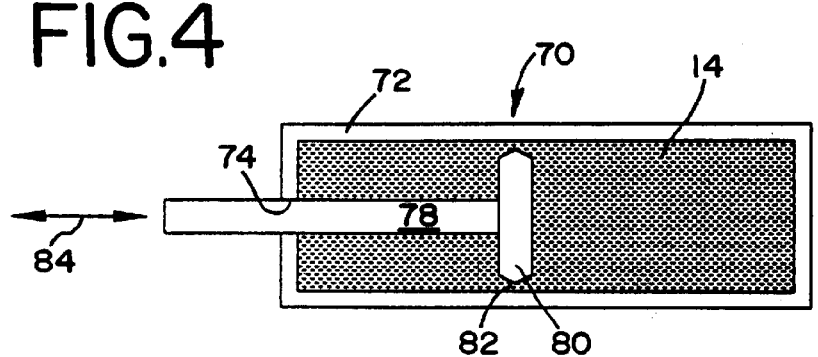
FIG. 4 presents an embodiment of a damped spring according to an aspect of the invention.

Referring now to FIG. 4, a spring 70 according to a further aspect of the invention is presented. The spring 70 comprises a hollow cylinder 72 that defines a first aperture 74 and a cavity filled with the microgel dispersion 14. A displacement rod 78 is disposed within the hollow cylinder 72 and protrudes through said first aperture 74. The displacement rod 78 comprises a flange 80 that defines an orifice 82. Movement of the displacement rod 78 into the cylinder 72 compresses the microgel dispersion 14 thereby generating a spring force on the displacement rod 78. Movement of the displacement rod 78, as indicated by arrow 84, causes microgel dispersion 14 to flow through the orifice 82 which generates dynamic damping by developing a pressure difference across the flange 80. Depending upon the viscosity of the microgel dispersion 14, a substantial amount of viscous damping may also be generated. Damping may be minimized or eliminated by omitting the flange 80.

The hydraulic media of the instant invention comprises a non-Newtonian fluid. More particularly, the energy dissipation media is a microgel dispersion. Preferably, the microgel dispersions of the instant invention have the following desired properties. First, the microgel dispersions are flowable under pressure. Second, they may be formulated to have relatively high compressibility which is comparable to other fluids used conventionally to dissipate kinetic energy. Third, the microgel dispersions of the instant invention have thermal expansion which is lower than the conventional energy dissipation fluids. Fourth, the microgel dispersions have low hysteresis. Fifth, the flow properties of the microgel dispersions are believed to be stable with time and usage.

The microgel dispersions of the instant invention preferably comprise a fluid as the liquid phase of the dispersion and microgel particles. The microgel particles are dispersed within the fluid to form a viscous gel-like material. The microgel dispersion has a high solids content. Preferably, the fluid used to form the liquid phase of the dispersion is a low viscosity fluid. Examples of the low viscosity fluids include silicone fluids, hydrocarbon fluids, and alcohols. Examples of suitable silicone fluids which can be used as the liquid phase which can be used in the microgel dispersion of the instant invention include polydimethylsiloxane fluids, polyphenylmethylsiloxane fluids as well as mixtures of these fluids. Examples of suitable alcohols include glycols, as well as mixtures of glycols with water. If glycol is employed the low temperature limit may be decreased to as low as −52° C. by the addition of an appropriate amount of water. A corrosion inhibitor may be desirable if water is employed in the microgel dispersion. Fluids know in the art for use as hydraulic fluids may be employed, including mineral oil, synthetic hydrocarbon fluids, alkyl benzenes, and dibasic acid esters. Suitable fluids are described in the Encyclopedia of Chemical Technology, Volume 12 (John Wiley 1980), under the title "Hydraulic Fluids."

Generally, the fluid used as the liquid phase of the microgel dispersion has a viscosity of at least 10 centistokes at 25° C. It is believed that a fluid having a viscosity of about 300,000 centistokes at 25° C. can be used in the microgel dispersion of the instant invention. Preferably, the fluid has a viscosity in the range of about 100 to about 150 centistokes. The viscosity of the liquid phase of the microgel dispersion can be increased depending upon the application of the final microgel dispersion. However, the fluid viscosity should not be low in order to minimize swelling of the microgel particles dispersed in the liquid phase. For example, the viscosity of the fluid in the liquid phase for use in a hydrostatic or hydrodynamic hydraulic transmission apparatus is approximately in the range of 10–10,000 centistokes. The viscosity of the liquid phase for an application wherein the microgel dispersion is forced to flow through an orifice is 10–1000 centistokes. The choice of the viscosity level of the low viscosity fluid is a matter of design choice well within the scope of one of ordinary skill in the art depending upon the final application of the microgel dispersion.

Examples of commercially available silicone fluids that can be used to form the liquid phase of the microgel dispersions of the instant invention include polydimethylsiloxane ("PDMS") trimethylsiloxy terminated fluids, phenylmethylpolysiloxane fluids and polydiphenyldimethylsiloxane fluids. As the phenyl group replaces the methyl group in the polysiloxane, the lubricity, oxidation resistance, thermal stability and shear resistance are enhanced, enabling the alteration of the fluid to the desired end application. Examples of commercially available polydimethylsiloxane fluids are Masil SF5, available from BASF Industries, PS 043, available from United Chemical Technologies, Inc. and SF 96, SF 97, SF 81 and Viscasil® fluids, all available from General Electric. Examples of commercially available phenylmethylpolysiloxane fluids are Masil SF 1221, available from BASF Corporation and PS 160, available from United Chemical Technologies, Inc. Examples of commercially available diphenyldimethylsiloxane fluids are PS060.5, available from United Chemical Technologies, Inc. And SF 1154, available from General Electric. The exact grade and type of silicone fluid chosen is dependent upon the exact application and well within the purview of one of ordinary skill in the art.

In addition to the fluid in the liquid phase, the microgel dispersion includes microgel particles. The microgel particles are preferably particles formed from a fully cured, high tear strength silicon rubber. This feature of the microgel particles is important since in a very high tear strength silicone rubber, excess strain energy brings about plastic deformation which facilitates in the dissipation of the kinetic energy applied to the dispersion. Generally, the tear strength of silicon rubbers should be at least 10 pli. Examples of suitable silicon rubbers that can be formed into the microgel particles include polydimethylsiloxane rubbers, polyphenylmethyl silicone rubbers and polydiphenyldimethyl silicone rubbers or mixtures thereof. The silicone rubber chosen depends upon the desired end application of the microgel dispersion. The choice of the particular silicone rubber is well within the skill of one of ordinary skill in the art.

These rubbers can be cured with an organic peroxide as instructed by the manufacturer of the silicon rubber. Any organic peroxide which can be used to cure the silicon rubber which forms the microgel particles of the instant invention. Examples of suitable peroxides and amounts which could suitably be used include but are not limited to benzoyl peroxide (level: 0.8 wt. %), bis (2,4-dichlorobenzoyl peroxide (level: 1.0 wt. %), dimethyl-2,5 di(t-butyl peroxide)hexane (level: 1.0 wt. %) and dicumyl peroxide (level: 1.0 wt. %). Generally, when silicone rubber is cured with peroxides, a two step process is used. In the first step, the rubber is cured for 10 minutes at 125° C. In the second stage of the cure, the rubber is cured for 8 hours at 205° C. An example of a commercially available peroxide used to cure the silicone rubber is PC 020, available from United Chemical Technologies.

Examples of commercially available silicon rubbers which can be used to form the microgel particles of the instant invention include SE 5211 U, a filled, peroxide curable low temperature methylphenylvinylsiloxane rubber, available from GE Silicones and SE 6635, a filled, peroxide curable low temperature phenylvinylsilicone compound also available from GE Silicones, and SE 54, a diphenylmethylvinyl silicone gum, available from GE Silicones.

These silicone rubbers used to form the microgel particles can also be blended with additives or polymer enhancers or modifiers or plasticizers. Generally, any additive or enhancer or modifiers or plasticizers can be used so long as it does not affect the properties of the microgel particles themselves. Examples of additives enhancers or modifiers which can be used include but are not limited to silica, thixotropic agents, corrosion inhibitors, stabilizers, flame retardants, adjuvents, and colorants.

For certain low temperature applications which require operability of the energy dissipating media in the range of approximately −40° C., such as the aircraft shock strut applications, the microgel particles may be formed from low temperature silicon rubbers. Examples of such low temperature silicone rubbers which can be used include polyphenylmethyl silicon rubbers and polydiphenyldimethyl silicon rubbers. For other applications, other silicone rubbers can be used provided that they meet the desired operating temperature ranges.

The particles used in the microgel dispersion should have a particle size in the range of about 1 microns to about 200 microns. Provided that the particles fall within this range, the microgel particles can be dispersed into the fluid to form the microgel dispersion. However, the exact size of the microgel particles depends upon the final desired properties of the microgel dispersion and are well within the scope of one of ordinary skill in the art. Preferably, the particles are about 1 micron to about 100 microns.

The microgel particles of the instant invention can be formed through a variety of methods. For example, it is believed that the microgel particles can be formed through emulsion polymerization. Alternatively, the microgel particles can be formed from cured silicone rubber which is reduced in size by any mechanical size reduction method and means. During the size reduction process, the linkage forces within the material to be reduced must be surmounted at the fracture surfaces.

Any mechanical size reduction means or method which can reduce the size of the particles to the desired micron size range set forth above can be used in the microgel dispersions of the instant invention. Mechanical size reduction means include grinders and crushers. An example of a suitable mechanical size reduction method to form the microgel particles of the instant invention is cryogenic grinding.

In cryogenic grinding, the temperature of the silicone rubber is reduced below −150 C using liquid nitrogen. A suitable grinder for size reduction is a Brinkmann Centrifugal Grinding Mill, available from Brinkmann Instruments, Inc., Westbury, N.Y.

Alternatively, the microgel particles can be made from a solid state extrusion pulverization process. In this process, the silicone rubber is extruded in a cured solid state at room temperature as opposed to the molten state and subjected to the simultaneous action of shear deformation and pressure at a temperature above the glass transition temperature of the rubber to be reduced in size. In carrying out this solid state extrusion pulverization process, an Instron capillary rheometer was used to extrude the cured silicone rubber through an orifice with a diameter of 0.05 inches and at a shear rate of at least 10 sec$^{-1}$ at room temperature, that means the cured rubber is subjected to simultaneous action of shear deformation and pressure at a temperature that is above its glass transition temperature (below −100 C). Thus, the cured rubber is reduced in size to obtain the preferred particle range.

The microgel particles are then mixed with the silicon fluid to yield a microgel dispersion. The dispersion comprises from about 1% to about 99% solid microgel particles in the liquid phase. Preferably, the dispersion comprises from about 30% to about 80% solid microgel particles in a liquid phase. In this preferred embodiment, the liquid phase comprises from about 20% to about 70% low viscosity fluids. Generally, the microgel dispersion of the instant invention will have a maximum viscosity of 60,000 poise at a shear rate of 100/sec. A lower viscosity may be desirable for an application wherein the microgel dispersion is forced to flow through an orifice. For a landing gear application, a viscosity on the order of 10,000 poise at a shear rate of 100/sec is applicable. The final viscosity of the microgel dispersion can be varied by the amount of the fluid in the liquid phase. The rheological properties of this microgel dispersion are influenced by the concentration of the microgel particles in the dispersion.

Additionally, additives can also be added to the microgel dispersion provided that they do not detract from the desired rheological properties of the microgel dispersion. Conventional additives known in the art as well as any other additive may be used. Examples of additives which can be used include but are not limited to silica, thixotropic agents, corrosion inhibitors, stabilizers, flame retardants, adjuvents, and colorants. A fluid having a relatively greater compressibility is preferably used in a microgel dispersion employed as the compressible medium in a spring.

The microgel dispersions of the instant invention are useful for the dissipation of the kinetic energy. The microgel dispersions have a initial yield stress. Up to this yield stress point, the material remains as a gel and no flow occurs. It is believed that the microgel particles form networks in the quiescent state of the microgel dispersion to enhance the dispersion viscosity that is characterized by the transient networks. When high shear forces are applied, the transient networks of the microgel dispersion are sheared. The microgel dispersion is converted from a high viscosity gel state to a low viscosity fluid state. This conversion from the high viscosity gel state to the low viscous fluid state facilitates the dissipation of the shock/impact energy that is being imparted to the microgel dispersion. After the high shear forces are relieved, the microgel dispersion reforms its transient network to increase the viscosity of the microgel dispersion. The low viscosity at high shear rate facilitates the lubrication of the moving piston. The characteristics of high viscosity at quiescent static state minimizes the leaking of the hydraulic media in the device in which it is employed.

This novel microgel dispersion can be used in various mechanical energy absorbing devices as well as devices which simultaneously absorb shock and dampen vibrations. Examples of possible uses of the microgel dispersion include aircraft shock struts, automobile bumpers, vibration dampers, bump stops for elevators, shock absorbers for collision energy and vibration energy.

In one application of the microgel dispersion of the invention, the microgel dispersion is used as the energy dissipating media in an aircraft suspension system.

The microgel dispersion can be used in a damped spring. The damped spring for an aircraft suspension comprises a hollow media housing having a media housing aperture; a displacement rod received within the media housing aperture, the displacement rod and the media housing defining a sealed cavity, the displacement rod terminating within the sealed cavity; and, a the microgel dispersion filling the cavity, the displacement rod telescoping into the media housing and compressing the microgel dispersion during landing of the aircraft thereby providing a vertical stopping force on the aircraft, wherein compression of the microgel dispersion is mechanically altered as the displacement rod telescopes into the media housing to emulate the compression of a gas.

Figure 9:
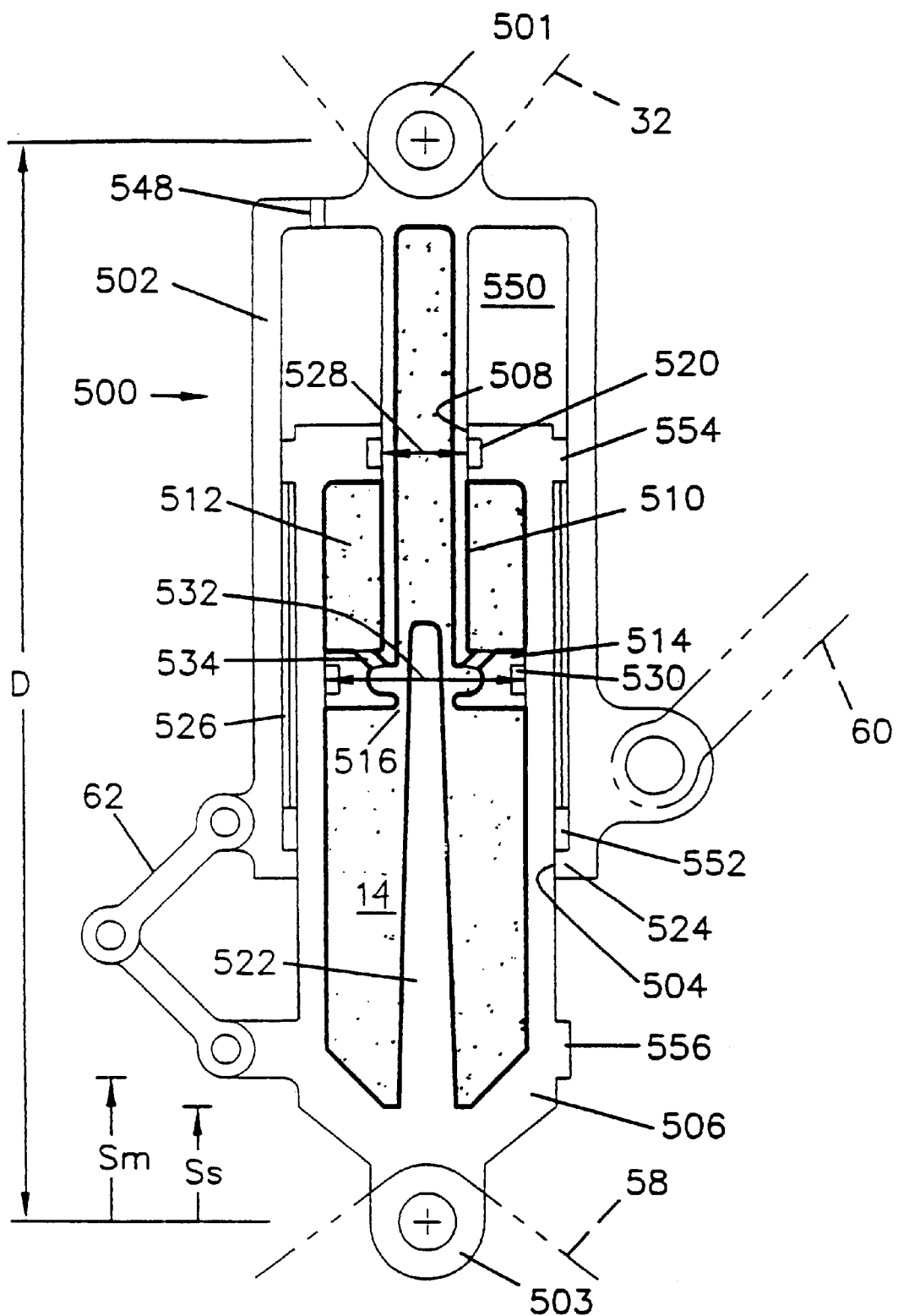
FIG. 9 presents a cross-sectional view of an aircraft shock strut according to an aspect of the invention.
Figure 10:
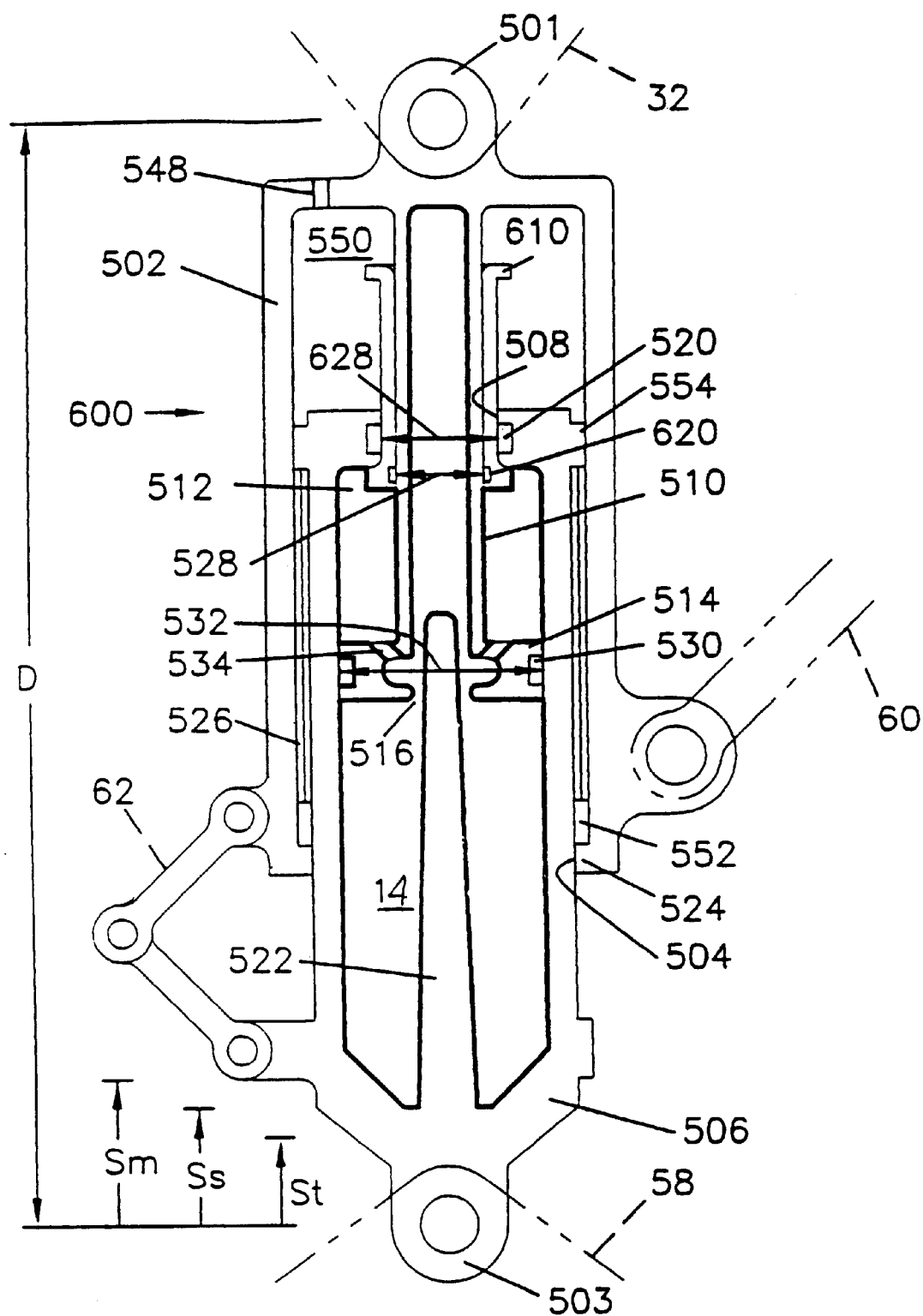
FIG. 10 presents a cross-sectional view of an aircraft shock strut according to an aspect of the invention wherein compression of the microgel dispersion is mechanically altered.
Figure 11:
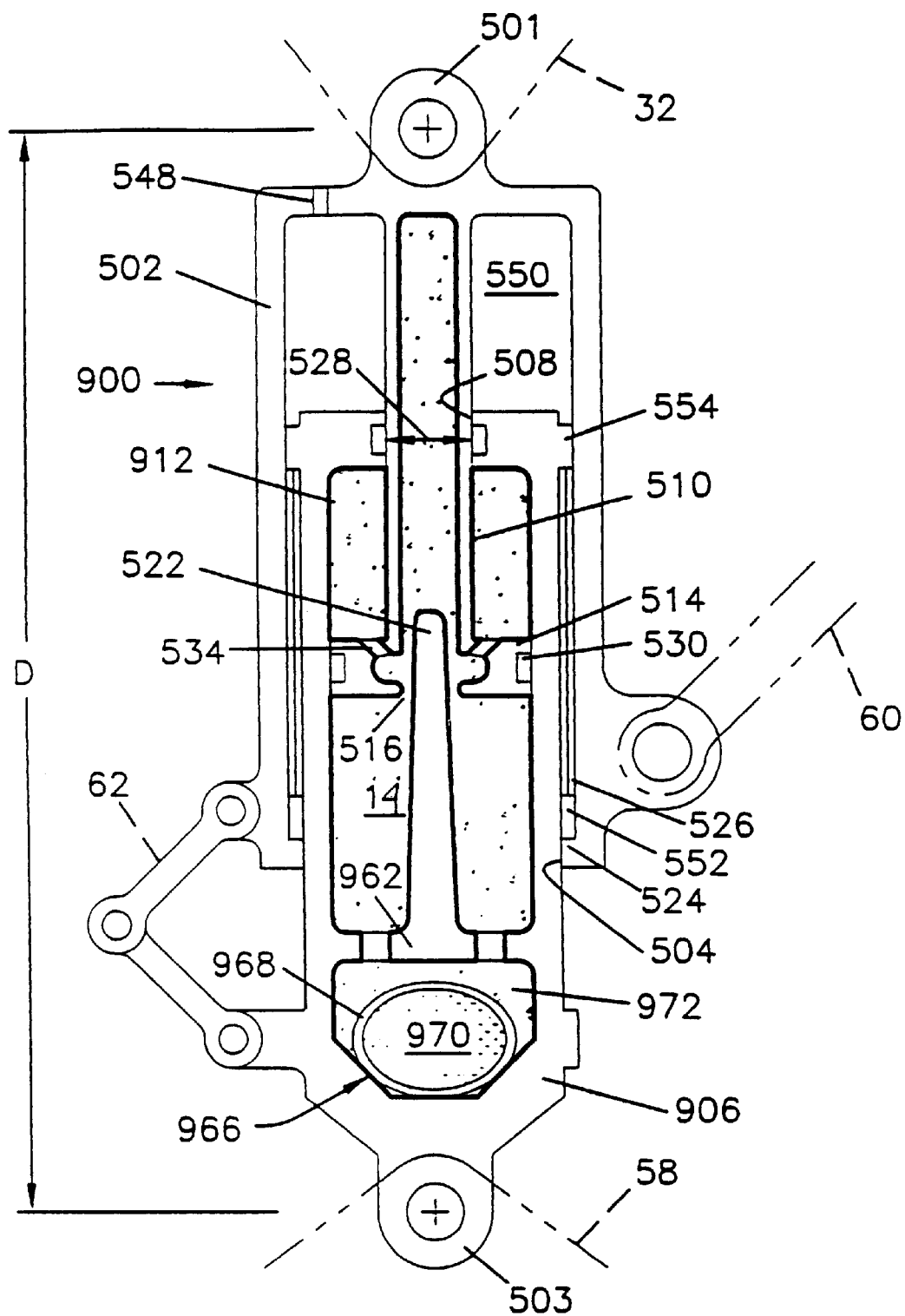
FIG. 11 presents a cross-sectional view of an aircraft shock strut according to an aspect of the invention wherein thermal expansion and contraction of the microgel dispersion is counteracted by a thermal compensator.

Referring now to FIGS. 9–11, various further embodiments of the invention are presented in an aircraft shock strut application. Referring now to FIG. 9, a cross-sectional view of a shock strut 500 at zero stroke is presented according to an aspect of the invention that may be employed in the suspension system of flight vehicles. In FIG. 9, shock strut 500 is fully extended, and has a fully extended length indicated as D. The shock strut 500 may be attached to an airframe 32 (shown in phantom) by a knuckle 501 and, by another knuckle 503, may be attached to a wheel and brake assembly or a wheel truck 58 (shown in phantom) that carries a plurality of wheel and brake assemblies. The shock strut 500 comprises a hollow outer housing 502 having an outer housing aperture 504, and a hollow media housing 506 received within the outer housing 502 and protruding from the outer housing 502 through the outer housing aperture 504. The outer housing 502 and media housing 506 carry shear loads induced by side-loading of the shock strut 500 during taxi. According to a preferred embodiment, the outer housing 502 and media housing 506 are both cylindrical. The media housing 506 has a media housing aperture 508. A first displacement rod 510 is fixed to the outer housing 502 and is received within the media housing 506 through the media housing aperture 508. The media housing 506 and the first displacement rod 510 define a sealed cavity 512 (boundaries indicated by heavier weight lines). A media housing seal 520 may be provided in the media housing aperture 508 between the media housing 506 and the first displacement rod 510. A damping head 514 is disposed within the cavity 512 fixed to the first displacement rod 510, and defines an orifice 516. According to a preferred embodiment, the first displacement rod 510 is hollow, and the damping head 514 defines the orifice in combination with a tapered metering rod 522 that passes through the damping head 514 inside the first displacement rod 510. The metering rod 522 is fixed to the media housing 506. Other orifice configurations are possible and contemplated within the practice of the invention, for example a fluted damping rod. A microgel dispersion 14 fills the cavity 512. As used herein, the term "fills" means that the microgel dispersion 14 fully occupies cavity 512, and excludes the intentional provision of a space occupied by gas or liquid within the cavity 512. The cavity 512 is filled by forcing the microgel dispersion 14 into the cavity with the shock strut 500 fully extended (as shown) and charging the microgel dispersion to an initial pressure Pi. During landing, the media housing 506 and the outer housing 502/displacement rod 510 telescope toward each and further compress the microgel dispersion 14 to pressures greater than the initial pressure Pi. This movement also forces some of the microgel dispersion 14 to pass through the orifice 516. One or more extension, retraction and/or locking mechanisms 60 may be attached to the shock strut 500, along with a torque linkage 62 that prevents rotation of the media housing 506 relative to the outer housing 502. Various other linkages and attachments may be provided as required for the specific application. A vent hole 548 may be provided to keep the pressure in an outer cavity 550 between the outer housing 502 and media housing 506 at essentially atmospheric pressure.

The microgel dispersion 14 is at the initial pressure Pi when the stroke is zero, before any vertical load is placed on the shock strut 500. The pressurized microgel dispersion 14 forces the media housing 506 away from the outer housing 502 when a vertical load is removed from the shock strut 500, after take-off for example, and the initial pressure ensures that the shock strut 500 will return to its zero stroke position. A ledge 524 may be fixed to the outer housing 504, and a lower bearing 552 may be disposed adjacent to the ledge 524. A spacer sleeve 526 may be inserted inside the media housing 506 resting against the lower bearing 552. An upper bearing/stop 554 is fixed to the media housing 506. The top of the spacer sleeve 526 engages the upper bearing/stop 554 at zero stroke and prevents the outer housing 504 and media housing 506 from separating any further. A maximum stroke stop 556 may be formed in the media housing 506 that engages the outer housing 502 at the maximum stroke. The two bearings 552 and 554 resist beam shear loads on the media housing 506 and outer housing 502 induced by side loads, and enhance the shear load carrying characteristics of the shock strut 500. The outer housing 502 and media housing 506 are each shown as single pieces for the sake of clarity. In practice, the various components comprising shock struts according to the invention are preferably formed from high strength steel, and assembled from multiple pieces, according to methods well known in the aircraft landing gear art.

The first displacement rod 510 compresses the microgel dispersion 14 to a pressure greater than the initial pressure Pi by decreasing the volume of the microgel dispersion 14, from its initial volume at zero stroke, as the outer housing 504 and media housing 506 are stroked toward each other. Stroking these two components toward each other forces the displacement rod 510 into the cavity 512, and the volume of the microgel dispersion 14 is decreased from its initial volume by the distance (the stroke) the first displacement rod 510 is forced into the cavity multiplied by the cross-sectional area 528 of the first displacement rod 510. The microgel dispersion 14 resists this motion with a force corresponding to the pressure of the microgel dispersion 14 multiplied by the cross-sectional area 528. Thus, the microgel dispersion 14 acts as a spring.

Figure 5:
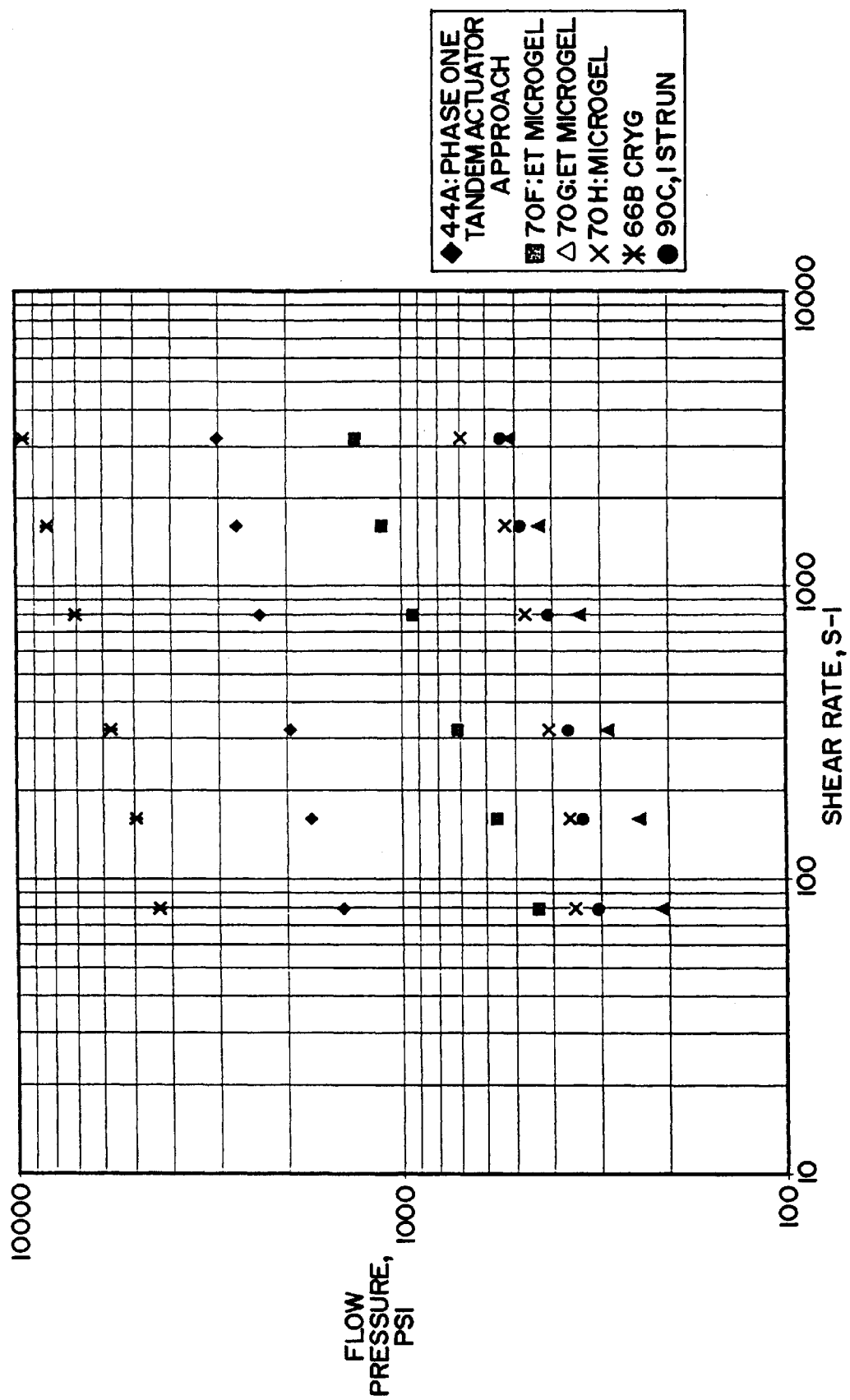
FIG. 5 is a graph showing the flow pressure versus shear rate of flow of the novel microgel dispersions of the instant invention.
Figure 6:
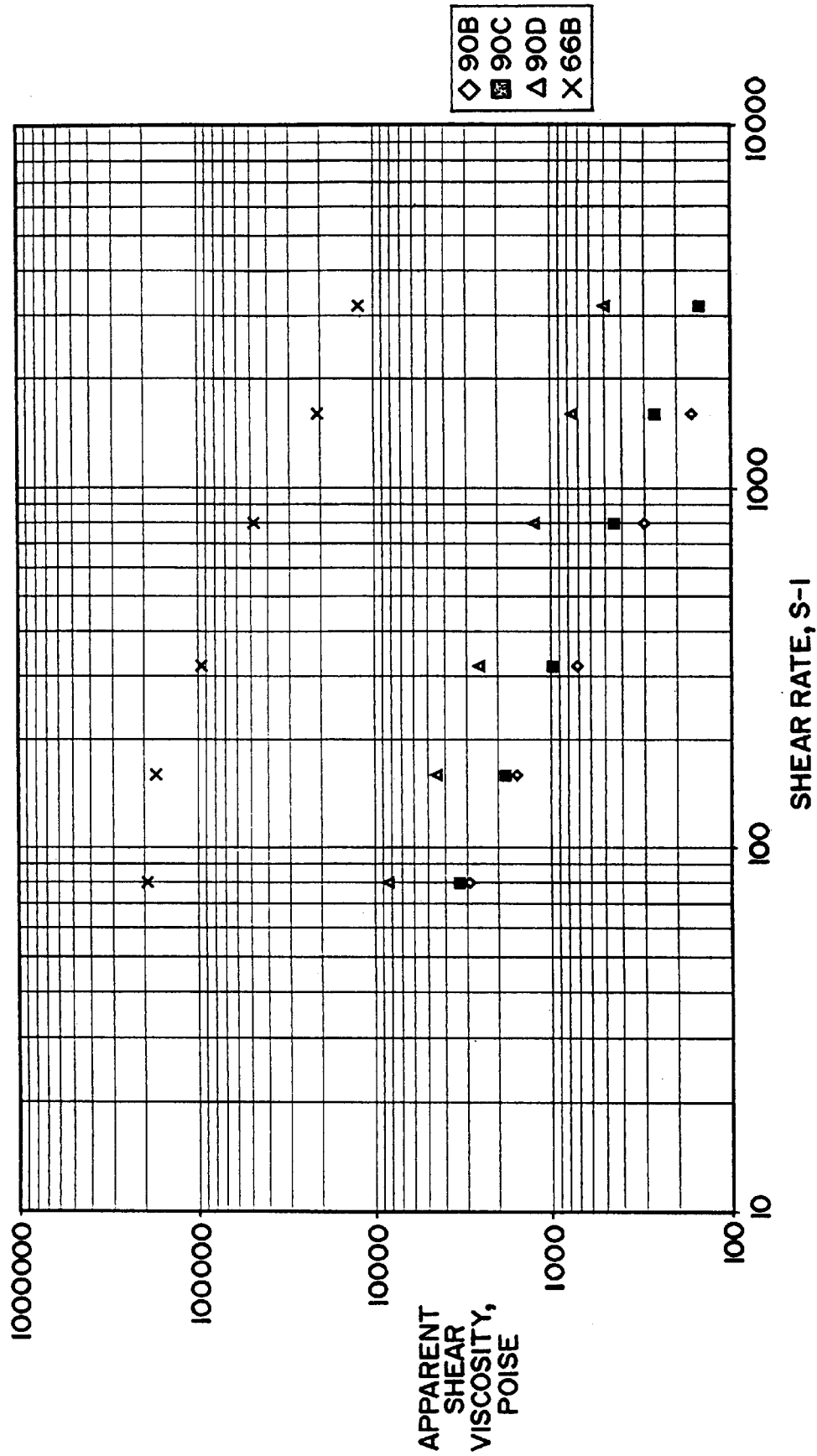
FIG. 6 is a graph showing the apparent shear viscosity in poise versus the shear rate of the microgel dispersion as a function of the weight percent of the microgel particles, in which the microgel dispersion comprising a fully cured low temperature silicone rubber particles in low viscosity silicone fluid liquid phase.
Figure 7:
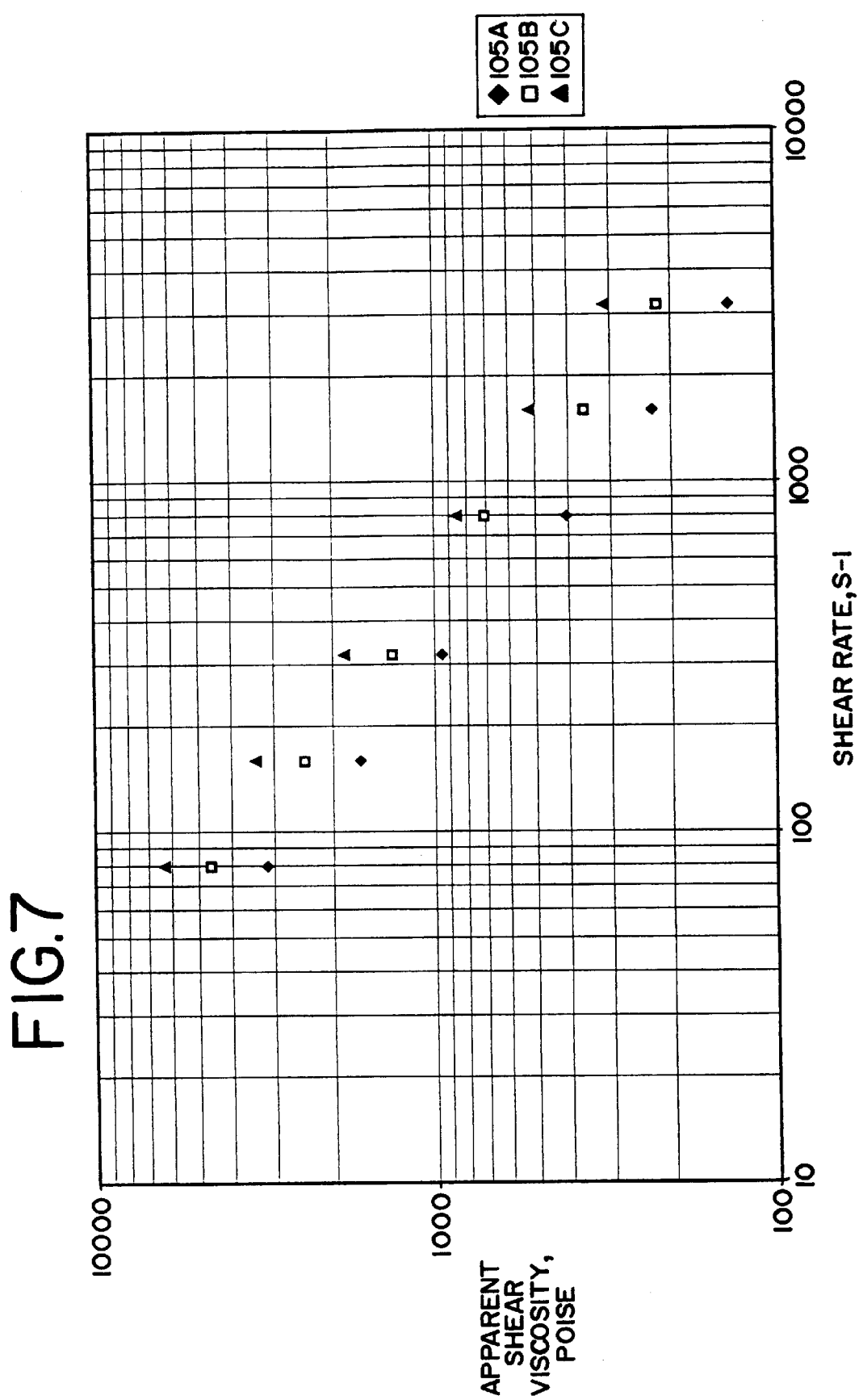
FIG. 7 is a graph showing the apparent shear viscosity versus shear rate of several examples of a microgel dispersions according to the instant invention as a function of the weight percent of the microgel particles in the microgel dispersion.
Figure 8:
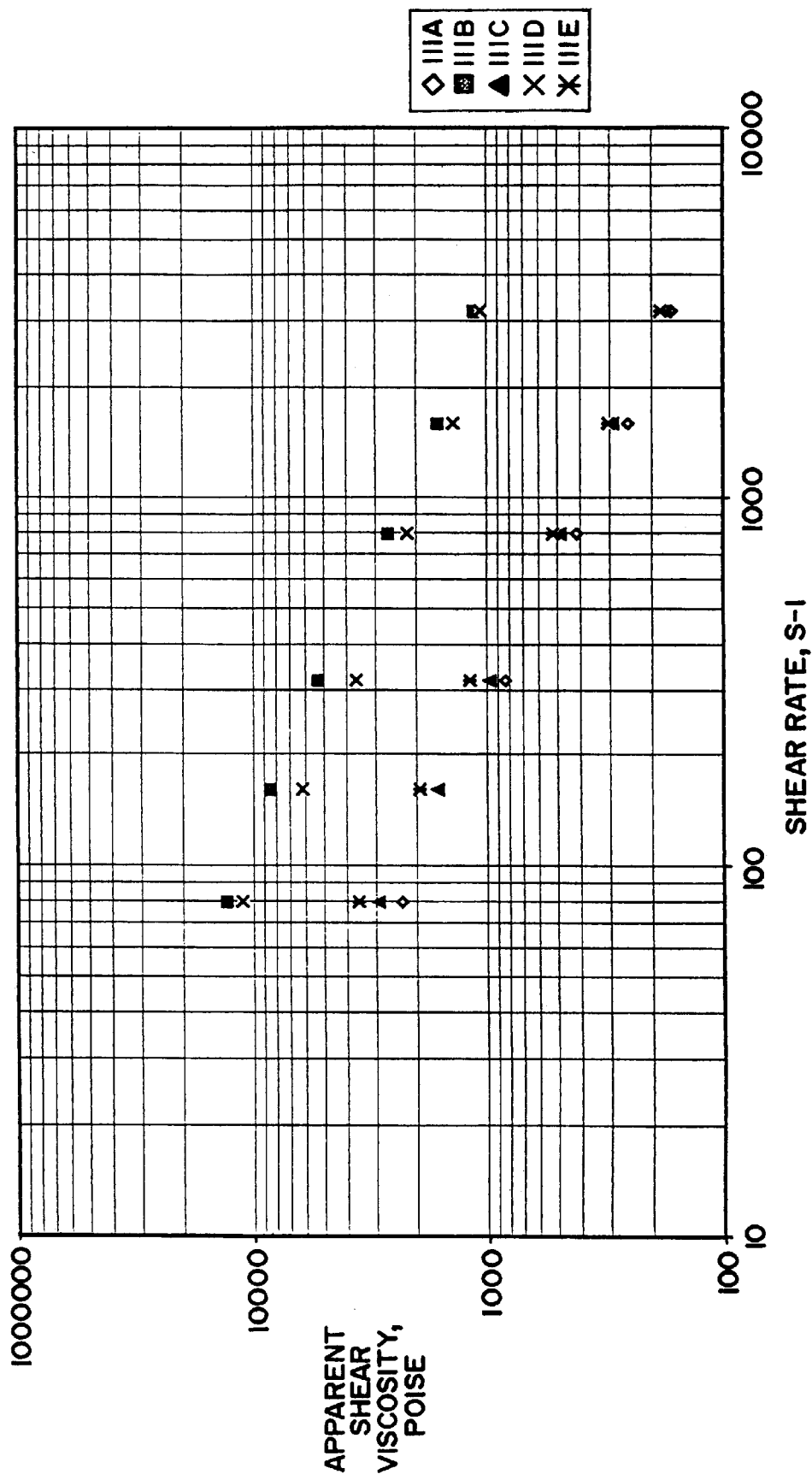
FIG. 8 is a graph showing the apparent shear viscosity versus shear rate of the microgel dispersions formed from rubber particles at two different stages of curing.

In addition to generating a spring force, the microgel dispersion 14 also generates a damping force when the shock strut 500 is stroked in either direction. In the example presented in FIG. 5, a damping head seal 530 is provided between the damping head 514 and the media housing 506. The damping head 514 translates through the microgel dispersion 14 as the outer housing 504 and media housing 506 are stroked toward each other, which forces the microgel dispersion 14 to pass through the orifice 516 and develop a pressure differential across the damping head 514. One or more passages 534 may be provided in fluid communication with the orifice 516 in order to permit the microgel dispersion 14 to pass from one side of the damping head 514 to the other through the orifice 516. Other orifice configurations are contemplated in the practice of the invention, for example an orifice without a metering rod 522. The damping force corresponds to the pressure differential multiplied by the cross-sectional area 532 of the damping head 514. The damping force and the spring force combine in summation to provide a predetermined vertical stopping force on the aircraft during landing, and a predetermined suspension force after landing for suspending the aircraft during taxi.

Referring now to FIG. 10, a shock strut 600 for an aircraft is presented wherein compression of the microgel dispersion provides a load stroke of increasing curvature with a static position at the static stroke Ss, which may be 80% of the total stroke needed for landing (Sm). Shock strut 600 is similar to shock strut 500, except shock strut 600 comprises a second displacement rod 610 in addition to the first displacement rod 510. The second displacement rod 610 is preferably tubular and encircles the first displacement rod 510. A second displacement rod seal 620 is disposed between the first displacement rod 510 and the second displacement rod 610. In this example, the media housing seal 520 is disposed in the aperture 504 between the media housing 506 and the second displacement rod 620. Only the first displacement rod 510 is forced into the cavity 512 until the outer housing 502 contacts the top of the second displacement rod 610 when the stroke equals a transition stroke St. At strokes less than St, the change in the volume of cavity 512 is the cross-sectional area 528 multiplied by the stroke S. When the stroke exceeds the transition stroke St, the outer housing 502 forces the second displacement rod 610 into the cavity 512 with the first displacement rod 510, thereby providing an increased cross-sectional area 628 that includes both the first and second displacement rods 510 and 610. Thus, for strokes greater than the transition stroke St, the change in the volume of cavity 512 is the cross-sectional area 628 multiplied by the stroke S. The first displacement rod 510 alone compresses the microgel dispersion 14 when the stroke is less than the transition stroke St, and the first displacement rod 510 and the second displacement rod 610 together compress the microgel dispersion 14 when the stroke is greater than the transition stroke St. Providing three or more displacement rods is also contemplated as may be provided to obtain a desired compression characteristic. Further embodiments suitable for mechanically altering the compression of the microgel dispersion are presented in co-pending patent application Ser. No. 08/947,412 entitled "Dry Media Suspension System for Aircraft" which is fully incorporated herein by reference.

Referring now to FIG. 11, a cross-sectional view of a shock strut 900 is presented having a thermal compensator, according to a further aspect of the invention. An aircraft suspension system is subjected to temperature excursions during use. Such temperature excursions depend on the environment in which the suspension system is employed.

For most systems, the temperature excursion will not likely exceed −70° C. to 55° C. (−94° F. to 131° F.), and may be on the order of −23° C. to 38° C. (−10° F. to 100° F.). It is not intended to limit the invention to a particular temperature range, although functionality of the suspension system is necessary throughout the temperature range under which operation is required. When the aircraft is parked, thermal expansion and contraction of the microgel dispersion 14 during temperature excursions increases and decreases the length D, which causes the aircraft to rise and fall. More importantly, thermal contraction of the microgel dispersion reduces the maximum available stroke Sm, which may render the shock strut susceptible to bottoming at colder temperatures. The thermal compensator according to the invention at least partially and/or fully mitigates these effects.

Still referring to FIG. 9, shock strut 900 comprises the outer housing 502 and a media housing 906 received within the outer housing 502, the microgel dispersion 14 filling a sealed cavity 912 defined within the media housing 906 and the outer housing 502. A damping orifice 516 is defined within the cavity 912. The microgel dispersion 14 fills the cavity 912. As previously described in relation to other embodiments, the media housing 906 and the outer housing 502/displacement rod 510 telescope toward each other a stroke distance during landing and compress the microgel dispersion 14 and force the microgel dispersion 14 to pass through the orifice 516, thereby providing a predetermined vertical stopping force on the airframe 32 during landing and a predetermined suspension force during taxi. A temperature compensator 966 is incorporated into the shock strut 900 and subjected to the suspension force while at least partially counteracting thermal expansion and contraction of the microgel dispersion 14 over a predetermined temperature range. According to the invention, the temperature compensator may take various forms that have sufficient strength to resist mechanical failure, and that develop sufficient force to act against the microgel dispersion 14 in order to counteract thermal contraction, while being subjected to the suspension force.

In shock strut 900, the temperature compensator 966 is disposed within the cavity 912, and comprises an expandable and contractible bag 968 containing a fluid 970 that changes phase over the predetermined temperature range. The bag 968 is preferably made out of an elastomeric material that may be fiber reinforced. The change in phase causes the volume of the fluid 970 to increase and at least partially compensate for the decrease in volume in the microgel dispersion 14 due to thermal contraction. According to a preferred embodiment, the fluid 970 is water if the predetermined temperature range includes the freezing point of water. Alternatively, a mixture of water and a freezing point suppressant, such as glycol or alcohol, may be employed provided that the objectives of temperature compensation are met. More than one bag 968 may be provided. The ratio of freezing point suppressant to water may be varied in each bag in order to vary the temperature at which each bag freezes, thus creating a range of temperatures over which the compensation occurs. According to a further preferred embodiment, the cavity 912 comprises a sub-cavity 972 in fluid communication with the rest of the cavity 912, and one or more temperature compensators 966 are disposed within the sub-cavity 972. The sub-cavity 972 may be defined by a perforated plate 962 to which the metering rod 522 is fixed. Further embodiments of temperature compensators that may be employed in the practice of the invention are described in co-pending application Ser. No. 08/947,265 entitled "Dry Media Suspension System for Aircraft With Temperature Compensation," the contents of which are fully incorporate herein by reference. In certain embodiments, mechanically altered compression of the microgel dispersion is combined with thermal compensation. Damped springs not having an outer housing are employed in certain aircraft landing systems, and the principles described herein may be applied equally as well in such systems. Existing seal technology may be employed for the various seals described herein, including seal technology employed for liquid springs.

Figure 12:
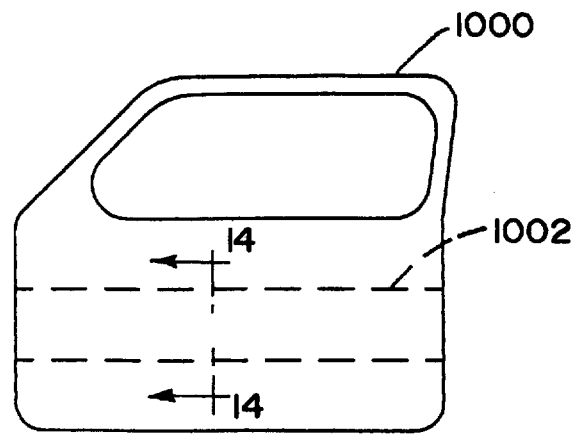
FIG. 12 presents a side view of a motor vehicle door having a side-impact beam according to an aspect of the invention.
Figure 13:
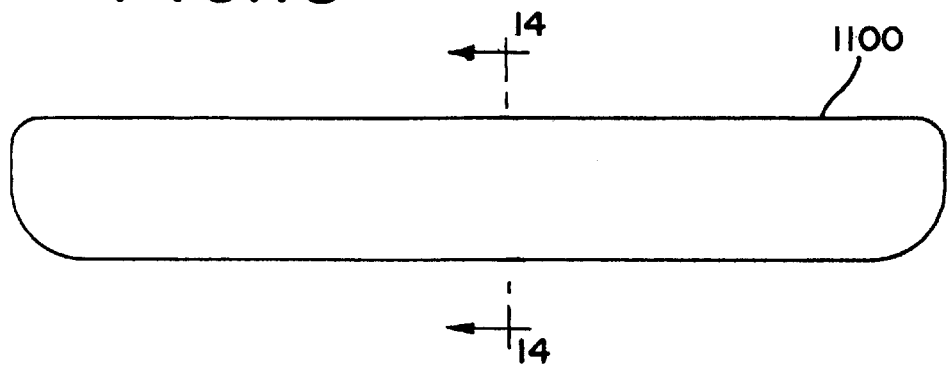
FIG. 13 presents a rear view of a motor vehicle bumper according to an aspect of the invention.
Figure 14:
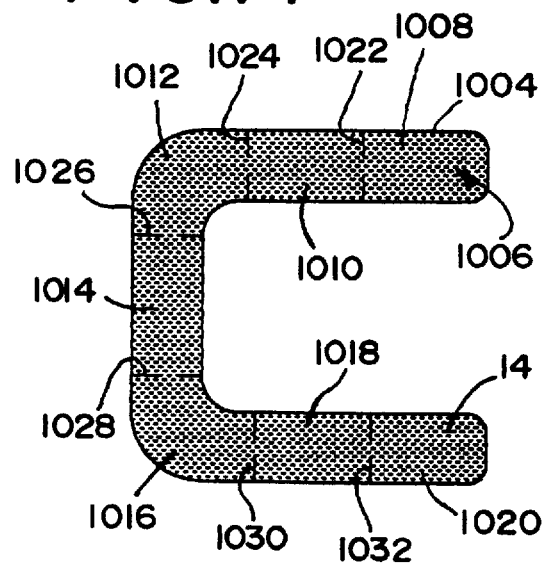
FIG. 14 presents a cross-sectional view representative of the cross-sectional construction along line 14—14 of FIGS. 12 and 13.

Referring now to FIGS. 12–14, embodiments that employ the microgel dispersion of the instant invention are presented according to further aspects of the invention. Referring specifically to FIG. 12, a side view of a motor vehicle door 1000 is presented having a side-impact beam 1002 (shown dashed). A cross-sectional view that is representative of the cross-sectional construction of the side-impact beam 1002 is presented in FIG. 14 and comprises an outer shell 1004 that defines a cavity 1006 that is partially or fully filled with the microgel dispersion 14. The cavity 1006 is divided into a multitude of sub-cavities 1008, 1010, 1012, 1014, 1016, 1018, and 1020 by perforated dividers 1022, 1024, 1026, 1028, 1030, and 1032. The outer shell 1004 and perforated dividers 1022, 1024, 1026, 1028, 1030, and 1032 may be formed from metal and/or plastics, and/or fiber reinforced plastics. A side impact into the door 1000 causes deformation of the side impact beam 1002 which, in turn, causes the microgel dispersion 14 to flow through the perforated dividers from one sub-cavity the next, thereby dispersing kinetic energy. A rear view of a motor vehicle bumper 1100 according to a further aspect of the invention is presented in FIG. 13 that has a cross-sectional construction similar to that presented in FIG. 14, and operates in the same manner to dissipate kinetic energy from a rear impact.

EXAMPLES

Example 1

Example 1 sets forth the composition of three different peroxide cured low temperature silicone rubbers which can be formed into the microgel particles used in the microgel dispersion of the instant invention. The first silicone rubber is formed from SE 54, a peroxide curable diphenylmethylvinyl silicone gum rubber available from General Electric Silicones. The second silicone rubber is formed from SE 5211U which is available from GE Silicones. SE 5211U is a filled methylphenylvinylsiloxane. Based upon its Material Safety Data Sheet ("MSDS"), SE 5211U is believed to comprise about 10–30 weight % of a tetramer treated fumed silica, about 5–10 weight % of a dimethyldiphenylsiloxane copolymer and about 60–80 weight % of a diphenylmethylvinyl siloxane gum. The third low temperature silicone rubber which can be used in the instant invention is SE 6635, a peroxide curable low temperature silicone which is also available from GE Silicones. SE 6635 is a phenyl vinyl silicone compound which is believed to be formed from about 10–30 weight % of tetramer treated fumed silica, about 1–5 weight % of a silanol stopped polydimethylsiloxane, about 1–5 weight % of silicones and siloxanes which are dimethylmethoxy terminated and about 60–80 weight % of diphenylmethylvinyl siloxane gum according to its MSDS. These silicone rubbers are cured according to the manufacturers instructions using benzoyl peroxide PC 020, available from United Chemical Technologies, Inc.

|  | Example A | Example B | Example C |
|---|---|---|---|
| SE 54 | 200 | | |
| SE 5211U | | 200 | |
| SE 6635 | | | 200 |
| Peroxide, PC 020 | 2.0 | 2.0 | 2.0 |
| Tensile Stress (at 20 in./min), psi | 110 | 1080 | 1390 |
| Tensile, break, % | 170 | 630 | 614 |
| Tear Strength (Die C at 20 in./min) lb/in. | 22 | 87 | 89 |

The tensile strength and tensile break were measured according to the tests set forth in ASTM D-412. The tear strength was measured according to ASTM D-624, Die B.

Example 2

Example 2 shows the compressibility of the microgel dispersions of the instant invention using two different silicone fluids for the liquid phase of the dispersion with the same microgel particles. The microgel particles were formed using the solid state extrusion process described above from silicon rubber. The silicone rubber was formed from SE 54, a peroxide curable diphenylmethylvinyl silicone gum rubber available from General Electric Silicones. The silicone rubber was fully cured according to the manufacturer's instructions prior to being reduced in size to about 1 to about 200 microns for use as solid phase of the microgel dispersion of the instant invention. The silicone rubber was cured with benzoyl peroxide PC 020. As seen from the table set forth below, the compressibility of these samples was measured.

The compressibility of the microgel dispersion was measured by a one dimensional compression test, using an Instron rheometer barrel with a solid rod insert. Such an instrument is described in FIG. 5 of the article "Thermomechanical Test Methods for Polymeric Powders" by Biing-Lin Lee, Powder Technology, vol. 63 (1990), pp. 97–101, incorporated herein by reference in its entirety. The % compression at a given pressure of a sample is calculated as follows:

$$\% \text{ Compression} = ((L_o - L_p)/L_o) \times 100\%$$

|  | Ex. C | Ex. D | Ex. E |
|---|---|---|---|
| Microgel particles from SE 54 | 100 | 25 | 10 |
| PDMS trimethyl siloxy terminated fluid from United Chemical, 100,000 cSt | | 25 | |
| Masil SF 1221, phenylmethylpolysiloxane fluid from BASF Corp. | | | 10 |
| Compressibility, % @ 10,000 psi | 3.97 | 4.58 | 4.42 |
| Compressibility, % @ 20,000 psi | 7.47 | 8.13 | 8.01 |
| Compressibility, % @ 30,000 psi | 10.2 | 10.89 | 10.70 |

The results set forth in the Table above show that either low viscosity silicone fluid or a high viscosity silicone fluid can be used as the liquid phase in the microgel dispersion to achieve similar compressibility results. Nonetheless, the hysteresis and the ability to flow of the microgel dispersion still need to be taken into account for the desired particular end application of the microgel dispersion. This generally requires the usage of a low viscosity fluid as defined herein.

FIG. 1 shows a graph of flow pressure versus shear rate of the flow of the microgel dispersions of the this example as well as the dry media as described in U.S. patent application Ser. Nos. 08/728,340, 08/731,099, and 08/728,352. The results show that the pressure required for flow can be tailored using the microgel dispersion of the instant invention. Additionally, the results show that less pressure is required to force the microgel dispersions of the instant invention through an orifice as compared to the other media described in the above-mentioned applications.

Example 3

Example 3 illustrates the compressibility of the microgel dispersions of the instant invention. The microgel particles in this example were formed from 200 parts of SE 5211U, peroxide curable low temperature silicone available from GE Silicones and 2.0 parts of PC 020 peroxide, available from United Chemical Technologies, Inc. The silicone rubber was cured according to the manufacturer's instructions and reduced in size to particles approximately 1 to about 200 microns using the cryogenic grinding method with a Brinkmann Centrifugal grinding mill described above. The examples set forth in the Table below show the compressibility as a function of the weight percent of the microgel particles in the microgel dispersions.

|  | Ex. G | Ex. H | Ex. I | Ex. J |
|---|---|---|---|---|
| wt. % microgel | 100 | 40 | 50 | 70 |
| Compressibility, % @ 10,000 psi | 3.58 | 4.15 | 4.18 | 4.06 |
| Compressibility, % @ 20,000 psi | 6.85 | 7.53 | 7.50 | 7.34 |
| Compressibility, % @ 30,000 psi | 9.38 | 10.25 | 10.25 | 9.92 |

FIG. 2 shows the apparent shear viscosity (in poise) of these samples as a function of the shear rate. SF 1221 silicone fluid was used in this example. The results show that the apparent shear viscosity decreases at high shear rates.

Example 4

In this example, microgel particles were made from 200 parts of SE 6635, peroxide curable phenyl-vinyl silicone compound, available from GE Silicones. 2.0 parts of PC 020 peroxide, available from United Chemical Technologies was added to the silicone rubber to cure the rubber. The silicone rubber was cured according to the manufacturer's instruction. The silicone rubber was then reduced in size to form the microgel particles by cryogenic grinding to approximately 1 to about 200 microns. These particles were then mixed into Masil SF 1221 phenylmethylpolysiloxane fluids from BASF Corporation. The amount of solid particles dispersed into the liquid phase of the fluid was varied. The Table set forth below lists the compressibility of various compositions.

|  | Ex. K | Ex. L | Ex. M |
|---|---|---|---|
| Microgel Particles | 10 | 15 | 18 |
| Masil SF 1221 | 10 | 10 | 7.5 |

-continued

|  | Ex. K | Ex. L | Ex. M |
|---|---|---|---|
| phenylmethylpoly-soloxane, BASF Corp. |  |  |  |
| wt. % microgel | 50 | 60 | 70 |
| Compressibility, % @ 10,000 psi | 4.42 | 4.22 | 4.12 |
| Compressibility, % @ 20,000 psi | 7.91 | 7.93 | 7.48 |
| Compressibility, % @ 30,000 psi | 10.61 | 10.56 | 10.11 |

This example shows that the compressibility of the microgel dispersion can be tailored to achieve the desired compressibility by varying the concentration of the particles in the microgel dispersion.

FIG. 3 shows the apparent shear viscosity of Examples K–M as a function of the shear rate.

Example 5

This example shows the room temperature compressibility of 60% solid microgel dispersion as a function of the silicone fluid used to form the microgel dispersion. The silicone fluids used in this example include a low viscosity polyphenylsiloxane fluid or a low viscosity polydimethylsiloxane fluid or a mixture of the two fluids. The low viscosity polyphenylsiloxane used was Masil SF 1221 from BASF Corporation. The low viscosity polydimethylsiloxane fluid used in this example was Masil SF 5, also available from BASF Corporation. In addition, the microgel particles in this example were formed from SE 5211 U and cured with 1 wt. % of PC 020 benzoyl peroxide. The particles were either cured to the first stage cure or to the second stage cure. The silicone rubber was reduced in size from about 1 to about 200 microns by cryogenic grinding method using a Brinkmann centrifugal grinding mill as described above.

|  | Ex. N | Ex. O | Ex. P | Ex. Q | Ex. R |
|---|---|---|---|---|---|
| Microgel particles, 1st stage cure | 15 | 15 |  |  |  |
| Microgel particles, 2nd stage cure |  |  | 15 | 15 | 15 |
| Masil SF 1221 Fluid, BASF Corp. | 10 |  | 10 |  | 5 |
| Masil SF 5 Fluid, BASF Corp. |  | 10 |  | 10 | 5 |
| wt. % microgel | 60 | 60 | 60 | 60 | 60 |
| Compressibility, % @ 10,000 psi | 4.36 | 4.53 | 4.32 | 4.52 | 4.53 |
| Compressibility, % @ 20,000 psi | 7.80 | 8.10 | 7.68 | 8.04 | 7.99 |
| Compressibility, % @ 30,000 psi | 10.51 | 10.80 | 10.31 | 10.75 | 10.65 |

The microgel particles in the following example were also formed from SE 5211U and cured with 2 wt. % of PC 020 benzoyl peroxide. The silicone rubber was reduced in size from about 1 to about 200 microns by cryogenic grinding using a Brinkmann Centrifugal Grinding Mill.

|  | Ex. S | Ex. T |
|---|---|---|
| SE 5211U, second stage cured microgel particles | 15 | 15 |
| Masil SF 1221, BASF Corp. | 10 | 0 |
| Masil SF 5, BASF Corp. | 0 | 10 |
| wt. % microgel | 60 | 60 |
| Compressibility, % @ 10,000 psi | 4.21 | 4.45 |
| Compressibility, % @ 20,000 psi | 7.59 | 8.03 |
| Compressibility, % @ 30,000 psi | 10.20 | 10.74 |

This example also illustrates that it is irrelevant whether the silicone rubber used in the microgel particles is partially cured or fully cured indicating that the degree of cure does not affect the ability of the dispersion to function as an energy dissipation medium. The amount of the solid microgel particles in the dispersion as well as the viscosity of the liquid phase are key. The amount of the solid microgel particles incorporated into the microgel dispersion relate directly to the ability of the microgel dispersion to dissipate energy.

Example 6

Figure 15:
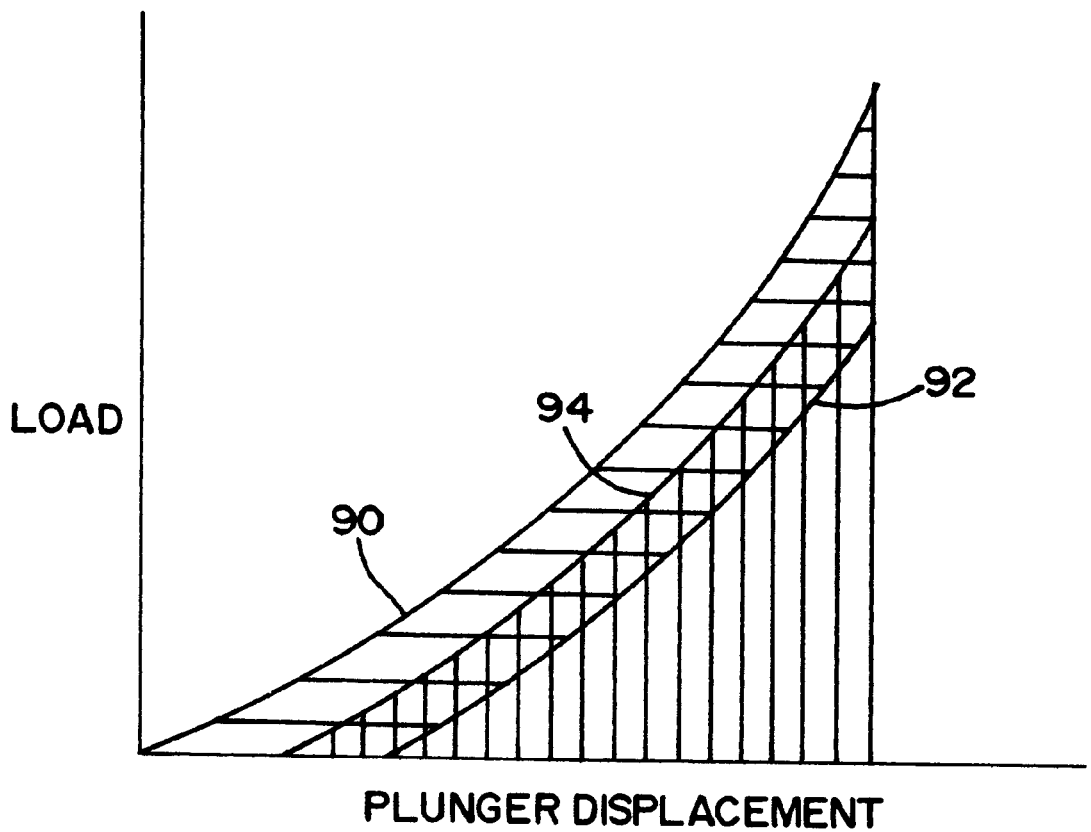
FIG. 15 presents a method of quantifying average hysteresis.

This example shows a composition according to the instant invention that can be used for aircraft landing gear strut application. In this example, 200 parts of SE 5211U filled methylphenylvinyl siloxane were fully cured with 2.0 parts of PC 020 peroxide according to the manufacturer's instructions. The silicone rubber was reduced in size to approximately 1 to 200 microns by the cryogenic grinding method using a Brinkmann Centrifugal grinding mill. These microgel particles were then mixed with Masil SF 1221 phenylmethylpolysiloxane fluid as the liquid phase to yield a dispersion comprising 60% by weight of the microgel particles and 40% by weight of the silicone fluid. The following results were obtained for hysteresis loss and compressibility. Hysteresis loss is an average calculated as indicated in FIG. 15, with curve 90 representing instroke of the plunger (or displacement rod), curve 92 representing outstroke of the plunger, and curve 94 representing the average of curves 90 and 92 with respect to load, in a spring according to the invention with no damping orifice.

| Hysteresis Loss 0–30 ksi |  |
|---|---|
| @ 130 F. | 7.7% |
| @ 70 F. | 5.9% |
| @ –40 F. | 10.9% |
| Compressibility, 0–30 ksi |  |
| @ 130 F. | 11.97% |
| @ 70 F. | 10.69% |
| @ –40 F. | 8.16% |

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention, is therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A method of dissipating kinetic energy comprising flowing a microgel dispersion through an orifice, wherein said microgel dispersion comprises a non-Newtonian fluid of about 20 to about 80% by weight of microgel particles and about 30 to about 70% by weight of a low viscosity fluid, wherein said microgel particles are comprised of silicon rubbers with a tear strength of at least 10 pli so that kinetic energy applied to the dispersion is dissipated.

2. A method according to claim 1, wherein said microgel dispersion comprises about 20 to about 80% by weight of cured silicone microgel particles and about 30 to about 70% by weight of a low viscosity silicone fluid.

3. A method according to claim 2, wherein said cured silicone microgel particles have a tear strength of at least 10 pli.

4. A method according to claim 2, wherein said cured silicone microgel particles comprise polyphenylmethyl silicone rubbers, polydiphenyldimethyl silicon rubbers or polydimethylsiloxane rubbers or mixtures thereof.

5. A method according to claim 2, wherein said low viscosity silicone fluid has a viscosity of at least 10 centistokes at 25° C.

6. A method according to claim 5, wherein said low viscosity silicone fluid comprises polydimethylsiloxane fluids, polyphenylmethyl siloxane fluids, or mixtures thereof.

7. A method of dissipating kinetic energy comprising applying shearing force to a microgel dispersion, wherein said microgel dispersion comprises a non-Newtonian fluid of about 40 to about 70% by weight of cured silicon microgel particles and about 30 to about 60% by weight of a low viscosity fluid, wherein said microgel particles are comprised of silicon rubbers with a tear strength of at least 10 pli so that kinetic energy applied to the dispersion is dissipated.

8. A method according to claim 7, wherein said cured silicone microgel particles comprise polyphenylmethyl silicone rubbers, polydiphenyidimethyl silicon rubbers or polydimethylsiloxane rubbers.

9. A method according to claim 7, wherein said low viscosity silicone fluid has a viscosity of at least 10 centistokes at 25° C.

10. A method according to claim 9, wherein said low viscosity silicone fluid comprises polydimethylsiloxane fluids, polyphenylmethyl siloxane fluids, or mixtures thereof.

* * * * *